United States Patent Office 3,234,125
Patented Feb. 8, 1966

3,234,125
REMOVAL OF WATER FROM AQUEOUS SOLUTIONS
Herman S. Bloch, Skokie, Ill., assignor to Universal Oil Products Company, Des Plaines, Ill., a corporation of Delaware
No Drawing. Filed Dec. 26, 1962, Ser. No. 247,354
17 Claims. (Cl. 210—59)

This invention relates to a solid resinous composition capable of forming a hydrate thereof in aqueous solution and in its hydrated form, capable further of releasing its water of hydration to return to its initial partially hydrated or non-hydrated form. More specifically, this invention concerns a resinous composition of matter and to the process of utilizing said composition to remove water from an aqueous solution whereby the solute concentration in the solution is increased for the purpose of producing a resulting more concentrated solution and/or for the purpose of recovering desalinized water from the initial solution, said resinous composition containing multiple, oxygen-bearing functional groups comprising the condensation product of an organic compound containing one or more of said functional groups and one or more intercondensable linkages.

It is one object of this invention to provide a process for withdrawing water from an aqueous solution. Another object of this invention is to recover substantially pure water from a saline solution, such as sea water. Another object of the present invention is to increase the concentration of solute in a given solution to thereby reduce the amount of water to be evaporated from the solution in the recovery of a more concentrated solution or an anhydrous solute product. Still another object of the present invention is to provide a process for economically removing water from an aqueous solution on a continuously operated basis and for removing water from the solution directly without involving the large-scale consumption of utilities.

In one of its embodiments this invention relates to a process for separating water from an aqueous solution which comprises contacting said solution with a resin insoluble in said solution and containing multiple, oxygen-bearing functional groups, effecting said contact at a relatively low datum temperature at which temperature said resin forms a hydrate with only the water component of said solution and the solute concentration in the remaining solution is increased, removing the resulting hydrated resin from said remaining solution, separately heating said hydrated resin to a temperature above said datum temperature and removing substantially pure water from a resulting regenerated resin containing lesser water of hydration than said hydrated resin.

Another embodiment of this invention relates to a hydrate-forming resinous composition which releases its water of hydration at a temperature relatively more elevated than the temperature at which said resinous composition forms a hydrate in contact with an aqueous solution, said resinous composition containing multiple oxygen-bearing functional substituents in an essentially organic structure formed by the condensation of an organic compound containing an oxygen-bearing functional substituent at condensation reaction conditions.

The need for potable water supplies and sources of water for human consumption and use has become a pressing problem of world-wide proportions, accentuated by the rapid increase in the population of all countries in the world. This need for a source of substantially ion-free water has arisen in part out of the need to put more and more land into cultivation as the ever-increasing requirement for greater food production necessitates the use of submarginal, water-deficient land for this purpose. Major urban centers of population have become hard pressed for new sources of potable water to supplement such rapidly dwindling or inadequate sources dependent upon underground wells, lakes, rivers and reservoirs. The salt water seas have always presented a virtually unlimited source of water, but the problem of providing an economically efficient method of separating water from its aqueous saline solutions to recover a potable water product at a reasonable cost and by methods dependent upon utilities available near the seacoast has been insurmountable.

Many types of processes have heretofore been proposed for separating potable water from aqueous solutions such as sea water, including evaporation utilizing solar heat to reduce the cost of utilities, crystallization (freezing), ion exchange, clathrate crystal formation and a variety of other processes which rely upon various physical and chemical desalinization techniques. Processes based upon crystallization and evaporation have generally been unacceptable because of heavy consumption of utilities and relatively high cost per unit product, except solar evaporation, which, however, requires excessive investment in capital equipment. Other physical and chemical means of separation have not been generally acceptable because the cost of the recovered water is prohibitive and even those processes which have reduced the cost of the recovered water to as low as about one dollar per thousand gallons are acceptable only in situations in which the ultimate use of the water justifies such high costs, as in desert locations far removed from fresh water sources. The present method of recovering water may also be applied to such remote sources, however, as brackish water lakes and wells containing alkaline solutes (borates, chlorides, sulfates, etc. of such alkali metals as sodium, lithium and calcium). These natural sources are available generally at higher initial temperatures of from about 10° to about 40° C., requiring higher "datum" temperatures in the present process. The present invention provides a means of separating potable water from the foregoing sources of aqueous solutions by an economically attractive method resulting in the simultaneous production of a more concentrated brine or concentrate from which the solute may be recovered, if desired, at a substantially lower cost than from the starting material because of the prior removal of a major proportion of the water in the feed stock solution.

In another application of the present method for separating water from its aqueous solution in which application the objective is not primarily the recovery of an ion-free water product, but the recovery of a more highly concentrated solution for its own sake or preparatory to the ultimate recovery of the solute in a substantially anhydrous condition in conjunction with evaporative drying of the concentrate, a substantial savings in the cost of utilities, primarily heating and pumping costs, is realized by combining the present water removal process with the aforementioned final evaporation step in which as much as possible of the water is removed from the aqueous feed solution in a pre-dewatering step prior to the final evaporative drying step; the present resinous composition is especially adapted to effect the initial dewatering stage by means designed to accomplish the separation of water from the solution with only nominal consumption of heat and other utilities.

Another typical application of the latter dewatering process embodiment is the removal of water from organic solvents containing an excess of water, such as the partial dehydration of alcohols and esters. Thus, the method may be applied to the removal of water from a desiccating glycol (for example, a glycol such as ethylene glycol previously utilized to dry a stream of gases, such as air); contact with the present resinous composition removes sufficient water from the aqueous glycol to restore substantially the desiccating capacity of the glycol. The limitation on such use of the present process is the requirement that the organic solvent be soluble in water and that the resinous composition be insoluble in the organic solvent. The present resinous compositions upon which the water recovery process of this invention primarily depends are members of a group of resins of essentially organic composition, which are insoluble in water under the conditions of use, of generally high molecular weight and containing multiple functional groups or radicals, preferably a large proportion of which are oxygen-bearing. Resinous and plastic compositions suitable for use in the present process as the hydrate-forming separating agent contacted with the aqueous feed solution are characterized primarily by their ability to form such hydrated compositions and secondarily by their ability to undergo successive heating and cooling cycles without undergoing alteration in their structure and composition. The terms: resin, plastic, polymer, condensation product, etc., designate materials of the same general class of substances and may be used interchangeably to designate the present water-retaining, hydrate-forming resinous composition of this invention, synthesized by condensing certain reactive monomers containing olefinic or diolefinic double bonds and/or other functional radicals which undergo intercondensation between themselves or with other functional groups. The condensation reaction may involve interaction between a number of molecules of the same monomer, yielding the so-called homo-polymer; between functional groups on two or more different monomers in the same reaction mixture producing the so-called heteropolymer; or between reactant monomers containing different condensable groups whereby the condensable group of one monomer interacts with a different condensable group of another monomer present in the reaction mixture, the resulting polymer or resin consisting of repetitive bi-monomer units of essentially the same structure and of high molecular weight. For the sake of convenience, the term "resin" will hereinafter refer generically to materials having resinous or plastic characteristics as well as to polymers generally.

Typical resins which serve the purpose of the hydrate-forming separating agent in the present process are those compositions which contain not only the residue formed via the condensation of the functional groups residing in the original monomer molecules and which account for the condensation reaction forming the polymer, but also those compositions which contain a multiplicity of other functional radicals in each individual unit of the repeating monomer building block comprising the polymer resinous structure. Indeed, the latter type of resin is preferred herein because the prevalence of functionality enhances the hydrophilicity of the resulting condensation product. That is to say, the ratio of functional radicals to monovalent methyl groups, divalent methylene groups or trivalent methylidyne units in the structure of the resin is preferably high, but more preferably within a certain range of maximum and minimum values to provide separating agents having the required hydrate-forming capacity, the required minimum melting points and water solubility, the required porosity and other physical and chemical properties which adapt the resin to its use in the present process. It has now been found, and this discovery provides the basis of the present invention, that compositions in which the functional radicals are oxygen-bearing radicals of preferably polar character or derived from polar radicals have the highest probability of possessing the required hydrate-forming capacity and that such oxygen-bearing radicals constitute the type of functional groups which provide resins having the desired physical and chemical properties.

The preference for oxygen-bearing functional groups in the structure of the resinous separating agent herein does not preclude, however, the presence of other functional groups, such as olefinic or aromatic unsaturation, amino, halogen, cyano, sulfhydryl, thiol, thiocyano or other non-oxygen containing functional, reactive, and intercondensable groups in the reactant monomer. When referred to herein and as contemplated herein, oxygen-bearing functional groups include both polar and non-polar radicals, although polar groups are preferred because of their enhanced hydrate-forming capacity, and of these, the hydroxyl group is especially effective, including, however (in the general order of preference), such oxygen-containing functional groups as carboxyl, carboxylate, nitro, sulfo, carboalkoxy, alkoxy and carbonyl (including both ketonic and aldehydic carbonyl), as well as salts of the acidic species of this group.

The preferred resinous and plastic compositions useful herein contain not more than 10 hydrocarbon units selected from methyl ($-CH_3$), methylene ($-CH_2-$) or methylidyne ($=CH-$) per functional group, and more preferably not more than from about 2 to about 8 of the foregoing hydrocarbon units per functional group, depending upon the activity of the functional group in contributing to the hydrate-forming capacity of the resin, as set forth in the foregoing general order of functional radical preference. Thus, a polymer or resin having hydrate-forming capacity may contain not more than six single carbon atom hydrocarbon units per free hydroxyl group when the latter are present as substituents on an aromatic nucleus, although it may be necessary to reduce the ratio to less than 3 when the functional group is a carbalkoxy group on the same hydrocarbon skeleton.

Still another characteristic of a resin which enables the material to be utilized as a separating agent in the present process is its molecular weight. In order to remain in the preferred solid form during the several operating stages of the separation process, from the formation of the resin hydrate at a relatively low temperature to the release of water of hydration at a relatively higher temperature provided during the dehydration, water-recovery stage of the process, followed by the removal of the separated water from the partially or wholly regenerated resin, the molecular weight of the resin should preferably exceed about 500, up to about 100,000 or more, depending upon the molecular composition of the resin and its ability to provide a material remaining in the preferred solid, structurally unyielding form over the range of temperatures utilized during the separation process. In the range of molecular weights above about 2,000, and more preferably above about 8,000, up to about 50,000, the resinous product will more likely be water-insoluble under the conditions of use, generally a preferred, if not required characteristic of the resin for continued use or re-use in the process. Although molecular weight is a general guide to the physical form that the resin will take when synthesized, the identity, the number and the arrangement of functional groups as well as the internal structure of the resin (whether cross-linked or an end-to-end polymer) are factors of primary importance in determining these properties.

A partially esterified polyvinyl alcohol resin formed by the partial hydrolysis of a polyvinyl alcohol ester, such as polyvinyl acetate, etc. is a typical and one of the preferred hydrate-forming resins which may be utilized with effectiveness in the present process. Thus, a useful resin is formed by the following sequence of reaction: vinyl acetate polymerized to a solid polymer having a molecular weight of from about 5,000 to about 50,000 by well-known polymerization techniques (for example, emulsion polymerization of vinyl acetate in the presence of a peroxide catalyst) and partially hydrolyzed to the partial ester by the procedure which involves: (1) mixing the solid, water-insoluble polymer with from 2 to about 10 volumes of an anhydrous organic solvent, such as methyl alcohol, acetone, etc., maintaining the polymer in contact with the solvent for a period of time sufficient to cause the polymer to swell to a volume at least double its initial volume and thereafter (2) adding to the swollen polymer a hydrolyzing aqueous base or acid (such as aqueous strong hydrochloric acid or potassium hydroxide), while maintaining the mixture at a temperature sufficient to reflux the solvent and for a period sufficient to hydrolyze at least 10 percent, up to about 90 percent, and more preferably from about 40 to about 85 percent of the acetate groups from the polymer. The resulting hydrolysis results in the replacement of a portion of the acetate ester groups in the polymeric structure of the polyvinyl acetate with the more hydrophilic hydroxyl groups, converting the polyvinyl acetate resin into a hydrate-forming resin capable of removing pure water from a feed stock consisting of an aqueous solution.

Other polyvinyl alcohol derivative resins which are useful as a hydrate-forming separating agent in the present process are formed by intermediate hydrolysis of polyvinyl acetate resins by means of the aforementioned acid or base hydrolysis, followed by condensation of the free hydroxyl groups present in the resulting polyvinyl alcohol resin with an aldehyde such as acetaldehyde, propionaldehyde, butyraldehyde, etc. which produce the so-called "acetals," comprising a product of relatively high water capacity in the hydrate-forming stage of the present process. Thus, hydrolyzed polyvinyl alcohol mixed with butyraldehyde in the presence of a small amount of a basic catalyst such as potassium hydroxide undergoes condensation to form "polyvinyl butyral," which is an effective resin for use in the process herein provided.

A vinyl alcohol heteropolymer of reduced water solubility but of substantial hydrate-forming capacity is formed by copolymerizing vinyl acetate with a monomer containing olefinic or polyolefinic unsaturation and copolymerizable therewith, such as styrene or vinyl chloride, and thereafter hydrolyzing the acetate ester radicals from the copolymer to form a resin in which most of the acetate groups are replaced by hydroxyl, having the required hydrate-forming capacity. The initial copolymerization is preferably effected by an emulsion copolymerization technique utilizing an aqueous soap solution as emulsifying agent and a peroxide catalyst, such as benzoyl peroxide, and continuing the copolymerization until the copolymer has a molecular weight of from about 5,000 to about 50,000. Hydrolysis of the acetate ester groups from the resulting copolymer is accomplished by acid or base hydrolysis, as aforesaid.

Another class of resins which provide an effective hydrate-forming separating agent for use in the present process are the resins prepared from cellulose as a base, including the partially esterified cellulose esters, preferably containing not more than one ester linkage per glucoside unit in the cellulose structure, such as the acetates, propionates, benzoates, nitrates, sulfates, phosphates, etc., all of which are common articles of commerce but modified to provide the foregoing preferred number of mono-ester groups per glucoside unit. The partial ethers of cellulose, such as the methyl ethers, ethyl ethers, and mixed methyl-ethyl ether, are also effective resins useful in the present process. Oxyalkyl ethers, including products such as hydroxymethyl cellulose and hydroxyethyl cellulose, as well as the carboxyalkyl ethers such as carboxymethyl cellulose and carboxyethyl cellulose, and their sodium or potassium partial salts, prepared by conventional procedures, constitute an especially preferred group of cellulose derivatives useful as the hydrate-forming resinous composition in the present process. Carboxymethyl cellulose is formed by a series of reaction steps involving the reaction of the initial cellulose with an alkali such as concentrated caustic soda to swell the cellulose fibers and form the alkali metal salt of the hydroxyl groups present in the molecular structure of the cellulose. The resulting alkali metal salt is thereafter reacted with chloroacetic acid which forms the intermediate sodium carboxymethyl cellulose derivative containing up to about 1.3 sodium carboxymethyl groups per glucoside unit in the cellulose structure. Hydrolysis of the latter sodium salt by mixing it with a dilute mineral acid such as sulfuric acid yields the free, water-insoluble carboxymethyl cellulose, comprising the desired separating agent herein. Hydroxyethyl cellulose is formed by the condensation of cellulose with ethylene oxide in the presence of a catalytic amount of concentrated base, such as caustic soda, followed by treatment of the resulting product with a strong mineral acid to hydrolyze the alkaline salt; the free hydroxyethyl cellulose is water-insoluble and capable of acting in the present process as the hydrate-forming resin.

A group of resins generally referred to as the "alkyds" in which the principal functional groups are the carboxyl and carboalkoxy radicals (and their alkali metal, alkaline earth metal and Group III metal salts) constitute another class of hydrate-forming resins useful as the water-separating agent in the present process, particularly the alkyds formed from the relatively low molecular weight dibasic acids such as maleic acid, fumaric acid, succinic acid, adipic acid, azeleic acid and sebacic acid. Alkyds having the desired hydrate-forming capacity are formed when the carboxyl group of these acids are esterified by such polyhydric alcohols as glycerol, inositol, cellulose, pentaerythritol, sorbitol, mannitol, trimethylolethane, various glycols such as ethylene glycol, diethylene glycol, propylene glycol, etc. and particularly the alcohols and acids containing more than two functional hydroxyl groups per molecule, such as glycerol and trimethylolethane. Another preferred class of alkyd esters are the esterification products of unsaturated acids such as the glycerol ester of maleic acid (mono-, di-, or trimaleate) which undergoes copolymerization with unsaturated alcohols or hydrocarbons (when a resin of minimum water solubility is desired), such as vinyl acetate, styrene, butadiene, isoprene, etc., or with other unsaturated acid esters such as methyl methacrylate and alkyl acrylate to molecular weights above about 2,000 and more preferably above about 5,000, the resulting polymers thus containing a large number of oxygen-bearing functional radicals relative to the proportion of methylene groups in the copolymer molecule.

Another effective group of hydrate-forming resins comprising a species useful in the present process as the separating agent are the urethanes formed by the condensation and/or polymerization of diols and triols with di- or polyisocyanates which form carbamic acid esters, broadly referred to as urethanes. Thus, glycols such as ethylene glycol, diethylene glycol, triethylene glycol, propylene glycol, etc. and the triols and polyols such as glycerol, trimethylolethane, inositol, polybutylene glycol, polyepichlorohydrin condense with phosgene to form poly- or bischloroformates which upon condensation with an alkylene polyamine at resin-forming condensation reaction conditions form the corresponding polyurethane resins.

Another class of resins which form hydrates in the presence of an aqueous solution and which are useful in the process of this invention as the resinous separating agent are the so-called "polycarbonates" formed by reacting a polyhydric alcohol with carbonyl chloride at reaction conditions which form long chain polycarbonates having molecular weights of at least 2,000, up to 10,000, or higher. Thus, a diol such as ethylene glycol or propylene glycol, a polyalkylene glycol such as diethylene glycol, trimethylene glycol, dipropylene glycol, and tripropylene glycol reacts with carbonyl chloride at temperatures of from about 50° to about 150° C. to yield the aforementioned polycarbonates. Utilizing polyhydric alcohols containing more than two hydroxyl groups per molecule, such as glycerol, inositol, cellulose, etc., the product is a resinous condensation product containing free hydroxyl groups in the structure of the resin which increase the water-retentive capacity of the resin and these accordingly are generally preferred over the polycarbonates prepared from diols in the present process as the hydrate-forming separating agent. The molecular weight of the resulting condensation products may be increased by utilizing an initial quantity of a relatively low molecular weight resinous product and continuing to add additional condensable monomer reactant to the reaction mixture as condensation continues and as the chain length of the condensation product increases to the desired molecular weight.

Certain polyamides containing at least 2 and preferably not greater than about 8 methylene units per amide radical are also useful in the present process as the hydrate-forming resinous composition. Thus, polyamines, such as the alkylene polyamines react with polybasic acids, such as the aliphatic and aromatic dibasic acids to form resinous polyamides of high molecular weight, in the form of hygroscopic, water-insoluble resins; these resins which contain the carboxamido group as the oxygen-bearing functional group are utilizable in the present process as the separating agent herein. Polyamines such as ethylene diamine, diethylene triamine, trimethylene diamine, tetramethylenediamine, triethylene tetramine, etc. and polyfunctional, preferably polybasic acids, including such aliphatic acids as acrylic acid, maleic acid, fumaric acid, succinic acid, etc. and such aromatic dibasic acids as phthalic acid, terephthalic acid, hemimellitic acid, etc. when reacted at conditions which form carboxamido groups between the carboxyl and amino groups via intermolecular condensation yield resins having the required hydrate-forming capacity.

A special class of resins formed by the polymerization of hydroxymethyl furfural produces a polymer resin containing repetitive hydroxyl groups which provide resinous materials having the requisite hydrate-forming capacity and the ability to act as separating agent for the removal of water from an aqueous solution according to the present process. These resins are formed by condensing hydroxymethyl furfural at temperatures of from about 80° to about 150° C. at a superatmospheric pressure sufficient to maintain a liquid phase in the reaction mixture and in the presence of an acidic or basic catalyst, the resulting high molecular weight polymer product having a molecular weight in the range of from about 2,000 to about 10,000 or higher.

The hydrate-forming resin, although usable in the form of spheres or other solid particulate shape, is preferably composited with a porous, structurally rigid support which may or may not perform an ancillary function in the process. The preferred supports are selected from porous, inert materials which have a relatively low specific heat. The support may be provided for the specific purpose of extending the resin whereby a relatively costly resin may be spread over the internal porous structure of a relatively inexpensive support to increase total resin surface per volume or weight of resin available to the solution, or in other instances, to provide a rigid structure upon which the resin, which may have a relatively low melting point (less than the maximum desirable dehydration temperature), may be spread to prevent the resin from agglomerating into a non-dispersed mass. Thus, the molten resin or a less viscous organic solvent solution of the resin (such as a methyl alcohol or methyl acetate solution of the resin containing from about 10 to about 25 percent by weight of the resin) may be used to impregnate a mass of regularly shaped, uniformly sized particles of firebrick, alumina, foamed urethane plastic, clay pills, blown, molten blast furnace slag (solidified and broken into particles), vermiculite, charcoal (preferably porous wood and coal chars) and other generally inert, refractory porous materials.

The present separation process utilizing a hydrate-forming resin of the above composition and properties is a multi-stage process in which the resin in finely divided form or in any other physical modification which provides a large surface area per unit of volume is thoroughly mixed with the aqueous feed stock solution to expose to a maximum degree the water contained in the aqueous solution to the hydrate-forming centers of the water-insoluble resin. This initial stage of the process is effected at the lowest temperature maintained during the process cycle, referred to herein as the "datum" temperature. After a period of contact between the resin and feed stock solution sufficient to maximize hydration of the resinous separating agent, the latter in the form of its hydrate is separated from the remaining, more concentrated solution, containing a higher proportion of the solute component than the feed stock solution. To recover the water of hydration from the resin hydrate and thereby to regenerate the resin to its hydrate-forming condition, the hydrate is heated to a temperature referred to as the dehydration temperature of the resin, usually above about 50° C., but below the softening or melting point of the resin. Preferably, the resin hydrate is heated during the pure water recovery stage to the maximum temperature limit tolerated by the resin (as determined by its softening point) or to the temperature at which maximum dehydration of the resin hydrate occurs, usually within the range of from about 50° to about 100° C. The "desorption" or release of the water of hydration from the resin hydrate at an elevated temperature is conveniently effected by contacting the resin hydrate with water heated to the desorption temperature, the released water of hydration thereby joining the stream of water desorbent which is removed downstream as the product effluent. Another method of desorbing the water of hydration (and concomitantly regenerating the resin to its hydrate-forming state) comprises contacting the resin with a fluid (either as a liquid or vapor) at the desorption temperature, the desorbent fluid being a material in which the resin is substantially insoluble. Thus, a resin containing a large proportion of polar, generally hydrophilic oxygen-bearing groups in its molecular structure is generally insoluble in such hydrocarbons as paraffins, naphthenes and aromatic hydrocarbons, represented, for example, by such specific hydrocarbons as n-pentane, n-hexane, n-nonane, etc., cyclohexane, benzene, toluene, etc., which form an immiscible dehydration effluent from which the water can be recovered, for example, by decantation. Any dissolved hydrocarbons in the water product may be dispelled therefrom by steam distillation or by adsorption on clay, charcoal or other solid adsorbent.

The water extract and the regenerated resin are separated at the dehydration temperature, each component being separately withdrawn, the extract as product and regenerated resin for re-use in the hydrate-forming stage for contact with fresh feed stock solution at the datum temperature. Intermediate heat exchange between the hot resin and a fluid stream used to carry heat to the resin hydrate during the dehydration stage not only cools the resin prior to contact with the feed stock solution, but also conserves heat required for dehydration. Thus, the resin is preferably cooled to substantially said datum temperature prior to recycle.

The proportion of resin to feed solution, the time of contact between the feed stock and separating agent, and the temperature of the system are all mutually dependent factors which determine the degree of hydration of the resin, although the solute concentration in the raffinate which represents maximum practical reduction of the water content of the solution in contact with the solid resinous particles, is a factor which varies from resin to resin, depending primarily upon the number and frequency of polar, functional groups in the chemical structure of the resin. In general, the limit to which the solute concentration of the raffinate can be appreciated by means of the present resin hydration process is from about 12 to about 15 percent solute content of the raffinate, a factor determined by the effect of one or more of the above conditions. The increase in the concentration of solute accompanying the dehydration of the feed stock solution is in direct proportion to the quantity of water held by the resinous separating agent in its hydrated form, a factor also determined by the character of the solute present in the aqueous feed stock solution. Although substantially no difference exists in the separation of water from solutions of electrolytic solutes and solutions of nonelectrolytic solutes, certain electrolytes compete more strongly with the resin to retain the water in solution and for these electrolytes, greater proportions of resin per unit volume of feed solution or resins of greater capacity and effectiveness must be employed in the dehydrating stage of the operation. Typical solutions of this character are those of solutes which are strongly hygroscopic and themselves form hydrates containing large proportions of water of hydration.

The proportion of resin to feed solution charged to the hydrate-forming stage of the process is largely dependent upon the capacity of the resin and the solute concentration in the feed solution. As a generalization, for solutions containing from 1 to 3 percent by weight of solute, the proportion of resin to feed solution generally falls within the range of from about 0.5 part of resin per part by weight of feed solution to 10 parts by weight of resin per part by weight of solution, such proportions being capable of reducing the water content of the raffinate solution to a level at which the solute concentration is about 10 to 15 percent by weight of the raffinate in a reasonable number of stages. For feed stock solutions containing from 3 to 8 percent by weight of solute and for reduction of the water content of the raffinate solution to solute concentrations of about 12 percent, from 0.3 to 6 parts by weight of resin per one hundred parts by weight of feed solution is generally required in the first stage of the process. More highly concentrated feed stock solutions (i.e., above about 8 percent) require substantially greater resin/feed ratios and their further dehydration is generally uneconomical.

The choice of suitable initial contact temperatures or datum conditions at which the resin is initially contacted with the feed stock solution to form the intermediate hydrate is generally a matter of convenience, temperature chosen being the lowest at which the feed stock solution is practically available. Thus, in the recovery of pure water from sea water, for example, temperatures of most sources of sea water vary from 2° to about 15° C., depending upon location, and such temperature is accordingly selected as the lowest practicable datum temperature for the process.

After a period of time sufficient to form the initial hydrate intermediate between the resin and water removed from the feed solution, preferably after a period of time sufficient to effect maximum hydration of the resin, the hydrate is removed from the remaining, more concentrated solution, referred to herein as the raffinate, for example, by filtration, centrifugation or by providing a countercurrent flow relationship between the incoming, upstream feed solution and the particles of solid resin effectively moving in the opposite direction relative to the feed solution.

Maximum water product quality (minimum solute concentration) is enhanced by removal of entrained raffinate from the hydrated resinous particles before recovery of pure water from the hydrated resin, thereby removing surface-adherent solute from the hydrated resin and preventing solute from entering the recovered water product. The latter process variation is particularly important when the desired end product of the process is primarily pure water, recovered from the hydrate. The removal of entrained solution from the hydrated resin intermediate in a continuous flow, countercurrent system of operation as described above, may be effected by flushing the hydrated resin with a countercurrent stream of pure water (such as a portion of the water product), recycled upstream to flow in a direction countercurrent to the hydrated resin and removed from the moving bed of resin particles at an upstream point corresponding to a solution of feed stock composition of solute. The temperature of the flush stream should be substantially less than the elevated temperature at which water recovery is effected in order to maintain the water of hydration intact during the flushing operation.

The present invention is further illustrated with respect to several specific improvements thereof in the following examples which, however, are not intended to restrict the generally broad scope of the invention necessarily in accordance with the specific embodiments recited therein.

*Example I*

A continuous process for the recovery of a potable water product containing less than 15 p.p.m. of dissolved salts is described in the following process. The process flow is based upon the "swing reactor" principle utilizing as feed stock to the unit sea water containing 3.3 percent by weight of dissolved salts (consisting mostly of sodium chloride) and supplied at a temperature of 8° C. The final product containing 15 p.p.m. of solute is the result of a two-stage desalinization process, using two pair of hydration-desorption beds with the water product of the first stage (containing about 0.82 percent solute) being fed as feed stock into the second stage set of hydration-desorption beds of resin from which the ultimate product containing less than 15 p.p.m. of solute is recovered.

The apparatus involved in each set of the pair of swing reactors consists essentially of two vertical columns approximately 10 feet in height and having an inside diameter of 18 inches. The columns are divided along their vertical height by internal ledges which support horizontal screens spaced approximately 8 inches apart, each screen supporting a layer of a water-insoluble resin hereinafter more specifically described, approximately 5.5 inches deep (when dehydrated), thereby allowing approximately 2.5 inches between the upper surface of the dehydrated resin layer and the superadjacent screen for expansion of the resin during the hydrating stage of the alternating hydrating-dehydrating cycles of the process. The screen (sieve No. 18) which is designed to retain on its upper surface particles approximately $\frac{1}{16}$ inch in cross section permits the flow of liquid upwardly through the column without substantial pressure drop and simultaneously distributes the liquid stream uniformly throughout the mass of solid particles supported by the screen. Fifteen horizontal, vertically spaced screens, each supporting a layer of the resin are maintained in each column.

The resin particles on each screen are approximately spherical in shape, composed of partially hydrolyzed polyvinyl acetate (polymerized vinyl acetate, subsequently partially hydrolyzed by dilute caustic to the partial ester in which approximately 36 percent of the acetate ester linkages are hydrolyzed to free hydroxyl groups). The resin prior to hydrolysis had an approximate, average molecular weight of about 12,500. The resin is shaped into substantially spherical particles by dropping the molten resin from a spinerette into cold water. A given weight of the resin (in its dry, dehydrated form) mixed with an excess of sea water containing 3.3 percent by weight of dissolved salts, absorbs water of hydration to the extent that after 5 minutes at 8° C. the resin filtered from the sea water raffinate contains approximately 11 percent by weight of salt-free water. As the hydrated resin is heated, it progressively dehydrates; thus, at 40° C. the partially dehydrated resin contains approximately 5 percent by weight of water; at 80° C. the water content of the resin is reduced to about 1.5 percent; at 90° C. the resin contains about 1 percent by weight of water.

The swing reactor principle by which the present process is made substantially continuous provides two resin-packed columns into one of which (column 1, containing relatively dehydrated resin particles) sea water is charged at the lowest or datum temperature (that is, at 8° C.) and into the other of which (column 2, containing previously hydrated or "spent" resin) hot water is charged at 95° C. to dehydrate the resin and recover the resulting water of hydration as the primary product of the process. The tops of both columns in each swing reactor pair are connected by a Y-shaped pipe which provides a conduit through which the effluent streams are removed from the top ends of both columns. A valve in each arm of the Y-shaped pipe connected to the outlets at the tops of the columns determines from which column concentrated brine by-product is withdrawn. A similar Y-shaped pipe interconnects the inlets at the bottom of each of the pair of columns through which sea water is fed from the center feed stock supply conduit, sea water flowing into either arm of the Y-shaped conduit, depending upon valves in each of the arms. A second Y-shaped interconnecting conduit is also provided at the top and bottom of each of the columns comprising the set of reactors for influx of hot water desorbent into the top of each column in turn and for efflux of deionized water product from the bottom of each of the columns at the appropriate stage of the cycle. Valves in each of the arms of the second pair of Y-shaped conduits determine into which column the desorbent is charged and out of which column the deionized water effluent is withdrawn. A separate line is attached to each arm of the deionized water effluent arm of the Y-shaped conduit at the bottom ends of each column through which flush effluent may be separately withdrawn following the initial period during each stage in which influent desorbent displaces interstitial (residual) sea water from the column.

Sea water is charged into the feed stock inlet line, the valve and the line leading to column No. 1 of the pair being closed while the valve to column No. 2 of each pair is open, column No. 2 containing regenerated resin following the preceding dehydration or regeneration stage of the process cycle. Hot water desorbent (i.e., at 90° C.) carried to the desorbent inlet of the columns through the separate Y-shaped conduit is directed into column No. 1 by opening the valve in the arm connected to column No. 1 and closing the valve in the arm connected to column No. 2, column No. 1 containing hydrated resin and residual seat water occupying the interstitial spaces between the resin particles. The hot water desorbent is charged at a rate insufficient to produce turbulence so that the interface between the desorbent and interstitial fluid advances downwardly through the column as a front, maintaining a definite line of demarcation between the desorbent and displaced saline solution. Such reverse flow operation of the desorption stage (i.e., in a direction opposite to the flow of feed stock through the resin bed or downward when the feed stock flows upwardly through the resin bed) is advantageous from several standpoints. Thus, the brine concentrate occupying the void spaces in the bed of particles is more dense than the hot desorbent and tends to settle away from the desorbent stream advancing through the bed. The line of demarcation or "front," between the influent desorbent and more dense brine solution thereby tends to be favored and remains distinct. In this respect, the operation enhances the gravitational effects operating in the column.

During the flushing stage of the process in which the aforementioned interstitial saline solution (approximately of sea water solute concentration, in equilibrium with substantially fully hydrated resin) is separately withdrawn from the column and recycled to the feed stock inlet conduit, the effluent is withdrawn from the side line of the arm of the Y conduit connected to the desorbate (deionized water) outlet pipe at the bottom of the column. When analysis of the flush effluent withdrawn from the side conduit indicates that the solute concentration in the effluent has dropped to a negligible value, the valve in the flush effluent side line is closed and the effluent stream is allowed to flow out of the product (deionized water) effluent line. Although the hot water desorbent is charged into the desorption zone of the process flow (indicated as column 2 of the pair comprising the present stage of the process) at a temperature of 95° C., 1.3 volumes (based on the void space volume in the column for the fully hydrated resin particles) of desorbent are required before the effluent stream has reached a temperature of 90° C. A large proportion of the heat required to raise the temperature of the desorbent to 90° is supplied by heat exchange between cool desorbent and desorbate effluent.

As the resin in column No. 1 approaches maximum hydration and equilibrium with the saline solution occupying the void spaces surrounding the resin particles, as indicated by the rise in the water content of the brine concentrate withdrawn from column No. 1, the functions of columns 1 and 2 are switched by reversing the flow of sea water feed stock and desorbent to the respective columns, hot water desorbent thereafter entering the top of column No. 1 and sea water feed stock entering the bottom of column No. 2 by closing the appropriate valves in each of the arms of the Y conduits separately feeding desorbate and salt water feed stock into the columns. The opening and closing of the valves in the effluent lines connected to the bottom and top, respectively, of each of the columns is delayed until the residual fluid in each of the columns has been displaced by the feed streams entering each of the columns. The flow rates of these feed streams however are less than the rate required to cause turbulence and mixing of the interfaces between the entering streams and the displaced interstitial fluids.

During each cycle of operation, the passage of sea water through the resin particles on each tray causes the initially dehydrated resin to swell and fill the space between the top of the resin bed and the bottom of each of the screens, a volume of approximately 5.5 ft.$^3$ in each column, representing approximately the volume of pure water adsorbed by the resin during the adsorption-hydration stage of the cycle, or 31 percent of the total internal volume of each column (17.7 ft.$^3$).

Following the adsorption stage in column No. 1 during which the resin particles swell to fill up the space between successive screens, the residual brine remaining in the interstitial spaces between the particles of hydrated resin is approximately 49 percent of the total volume of the column, or 8.7 ft.$^3$, the desalinized water used for displacing interstitial brine being recycled to the column through an intermediate heater which raises the water temperature to 95° C. As the hydrated resin is gradually heated to the incoming desorbent water temperature, it shrinks and loses its water of hydration which combines with the desorbent and increases the volume of effluent by the amount retained by the resin. During each cycle 513 pounds of sea water is charged into the resin bed of the first stage set of columns undergoing hydration. The volume increase of the desorbent (yield of partially desalinized water) is 5.1 ft.$^3$ or 318 lbs. of partially desalinized product per cycle and the yield of brine concentrate is approximately 195 pounds of brine containing 6.9 percent by weight of dissolved salts. The partially desalinized water effluent of the first stage contains about 1.13 percent by weight of dissolved salt. The latter, partially desalinized water effluent of the first stage set of hydration-dehydration columns is utilized as feed stock to a second set of similar columns, packed with the same resin particles and operated at essentially the same hydration and desorption temperatures, except that the partially desalinized effluent of the first stage columns (feed stock to the second stage set of columns) and containing about 1.13 percent by weight of solute is heat exchanged with cold sea water (at 8° C.) and reduced in temperature to a datum temperature of 19° C. The effluent products after several stages, consisting of deionized water containing 12 p.p.m. of solute and a separate effluent brine product concentrate containing 6.1 percent by weight of solute are withdrawn as ultimate products of the process. The net yield of desalinized water is 4.2 ft.$^3$ or 262 lbs., representing an ultimate yield of water product of 51 percent, based on the weight of sea water charged.

By heat exchanging the desorbate and the first portion of the brine effluent with deionized water desorbent entering the desorption column at the same time that desorbate is withdrawn from the column undergoing desorption, approximately 35 percent of the heat input into the desorption column is conserved.

*Example II*

Utilizing the apparatus and procedure specified in Example I, above, a water product of substantially the same quality (purity) is recovered and the yield is increased to 4.8 ft.$^3$ per cycle when the resin is suffused onto the internal pore surfaces of a porous carrier for the resin (charcoal particles, screened to a size of about $\frac{1}{16}$ inch average cross-section). The adsorbent in this run is prepared by soaking the charcoal particles (Norit brand, granular) in a 25 percent solution of a maleic acid-inositol alkyd resin (molecular weight about 5,000) in methyl alcohol followed by evaporation of the alcohol solvent from the resin-infused charcoal.

Each column of the first stage apparatus is charged with resin-charcoal composition, providing 15 trays, each containing a layer of particles approximately 8 inches in depth. During each cycle 560 pounds of sea water charged into the first stage set of beds containing regenerated resin produces 350 pounds of partially desalinized water containing about 1.08 percent by weight of solute and 210 pounds of brine containing about 7 percent by weight of dissolved solids. The yield of ultimate products from the several stages of hydration-dehydration columns is 300 pounds of water containing 12 p.p.m. of dissolved solute and 54 pounds of brine containing 6.9 percent by weight of salt. The specific heat of the adsorbent is substantially less than the solid resinous adsorbent utilized in Example I (approximately one-half), resulting in a net reduction of heat load on the system of about 26 percent.

Although the columns in this run contain a total volume of adsorbent (resin-charcoal particles) approximately 45 percent greater than the columns utilized in Example I, the quantity of resin which is the active hydrate-forming component of the adsorbent, is less than 15 percent of the quantity utilized in Example I. Each tray is filled to full capacity with the adsorbent since the swelling of the resin on the pore surfaces of the charcoal as hydration takes place is accommodated within the internal pore volume. The hydration is primarily a surface effect and the substantially greater total surface provided by coating the internal surface areas of the pores provides greater efficiency in the use of resin.

I claim as my invention:

1. A process for separating water from an aqueous solution which comprises contacting said solution with a resin insoluble in said solution and containing multiple, oxygen-bearing functional groups and also containing, per oxygen-bearing functional group, from about 2 to about 8 hydrocarbon units selected from the class consisting of methyl, methylene and methylidyne radicals, effecting said contact at a relatively low datum temperature at which temperature said resin forms a hydrate with the water component of said solution and the solute concentration in the remaining solution is increased, removing the resulting hydrated resin from said remaining solution, separately heating said hydrated resin to a temperature above said datum temperature and removing substantially purer water from a resulting regenerated resin containing lesser water of hydration than said hydrated resin.

2. The process of claim 1 further characterized in that said aqueous solution contains less than about 8 percent by weight of dissolved solute.

3. The process of claim 1 further characterized in that said hydrated resin is heated to said temperature above the datum temperature to thereby effect dehydration of the hydrated resin by contacting the hydrated resin with water at a temperature above about 50° C.

4. The process of claim 1 further characterized in that water is recovered from said hydrated resin by contacting the hydrated resin with a fluid in which said resin is insoluble at a temperature above said datum temperature.

5. The process of claim 4 further characterized in that said fluid is contacted with said hydrated resin at a temperature above the boiling point of said fluid.

6. A process for separating water from sea water which comprises contacting said sea water with a resin insoluble in the sea water and containing multiple, oxygen-bearing functional groups and also containing, per oxygen-bearing functional group, from about 2 to about 8 hydrocarbon units selected from the class consisting of methyl, methylene and methylidyne radicals at a temperature of from about 2° to about 15° C. whereby said resin forms a hydrate with the water component of said sea water and the salt concentration in the resulting brine is increased, separating the resulting hydrated resin from said brine, separately heating said hydrated resin to an elevated temperature of from about 50° to about 100° C. and removing water containing substantially less solute than sea water from a resulting regenerated resin containing lesser water of hydration than said hydrated resin.

7. The process of claim 6 further characterized in that said hydrated resin is heated by contact with water at said elevated temperature to thereby dehydrate said hydrated resin and form said resulting regenerated resin.

8. The process of claim 6 further characterized in that said resin hydrate separated from said brine is flushed with water at a temperature below said elevated temperature and at conditions adapted to remove superficial brine from the surface of said resin hydrate.

9. A process for separating water from brackish water which comprises contacting said brackish water with a resin insoluble in said brackish water and containing multiple, oxygen-bearing functional groups and also containing, per oxygen-bearing functional group, from about 2 to about 8 hydrocarbon units selected from the class consisting of methyl, methylene and methylidyne radicals at a temperature of from about 2° to about 40° C. whereby said resin forms a hydrate with the water component of said brackish water and the solute concentration in the resulting concentrate is increased, separating the resulting hydrated resin from said concentrate, separately heating said hydrated resin to an elevated temperature of from about 50° to about 100° C. and removing water containing substantially less solute than said brackish water from a resulting regenerated resin containing lesser water of hydration than said hydrated resin.

10. A hydrate-forming water-insoluble resin containing multiple oxygen-bearing functional substituents in an essentially organic structure formed by the condensation of an organic compound containing an oxygen-bearing functional substituent at condensation reaction conditions, said resin also containing, per oxygen-bearing functional group, from about 2 to about 8 hydrocarbon units selected from the class consisting of methyl, methylene and methylidyne radicals.

11. The resin of claim 10 further characterized in that said oxygen-bearing functional substituent is an hydroxy radical.

12. A composition comprising the resin of claim 10 deposited upon the internal pore surfaces of a porous solid particle.

13. The composition of claim 12 further characterized in that said porous solid is charcoal.

14. A resin as defined in claim 10 further characterized in that said resin is a partially hydrolyzed polyvinyl alcohol ester having a molecular weight of from about 2,000 to about 25,000.

15. A resin as defined in claim 14 further characterized in that said ester has from about 10 percent to about 85 percent of its ester linkages replaced by hydroxyl groups.

16. A resin as defined in claim 10 further characterized in that said resin is an alkyd ester formed by the condensation of a polyhydric alcohol with a polybasic acid.

17. A resin as defined in claim 16 further characterized in that said alkyd ester is the condensation product of inositol and maleic acid.

References Cited by the Examiner

UNITED STATES PATENTS

| | | | |
|---|---|---|---|
| 1,091,732 | 3/1914 | Callahan | 260—75 |
| 1,424,137 | 7/1922 | Weisberg et al. | 260—75 |
| 2,056,656 | 10/1936 | Ellis | 260—75 |
| 2,640,816 | 6/1953 | Germain | 260—91.3 |
| 2,773,028 | 12/1956 | Monet | 210—33 |
| 2,950,271 | 8/1960 | Snyder | 260—91.3 |

OTHER REFERENCES

Properties and Uses of Hercules Cellulose Gum, pages 1–18, pages 3 and 4 particularly relied upon.

Saline Water Conversion, No. 27, Advances in Chemistry Series, pages 40–49, page 42 particularly relied upon.

Reseach on Liquid-Liquid Extraction for Saline Water Conversion, by Office of Saline Water, Report No. 22, pages 1–10 relied upon, pages 7–9 particularly relied upon.

Schildknecht, Vinyl and Related Polymers, copyright 1952 by John Wiley & Sons, Inc., pages 350–351 relied upon.

MORRIS O. WOLK, *Primary Examiner*.